Oct. 27, 1936. R. K. GRAY Re. 20,143
LOCK
Original Filed Jan. 26, 1931 2 Sheets-Sheet 1
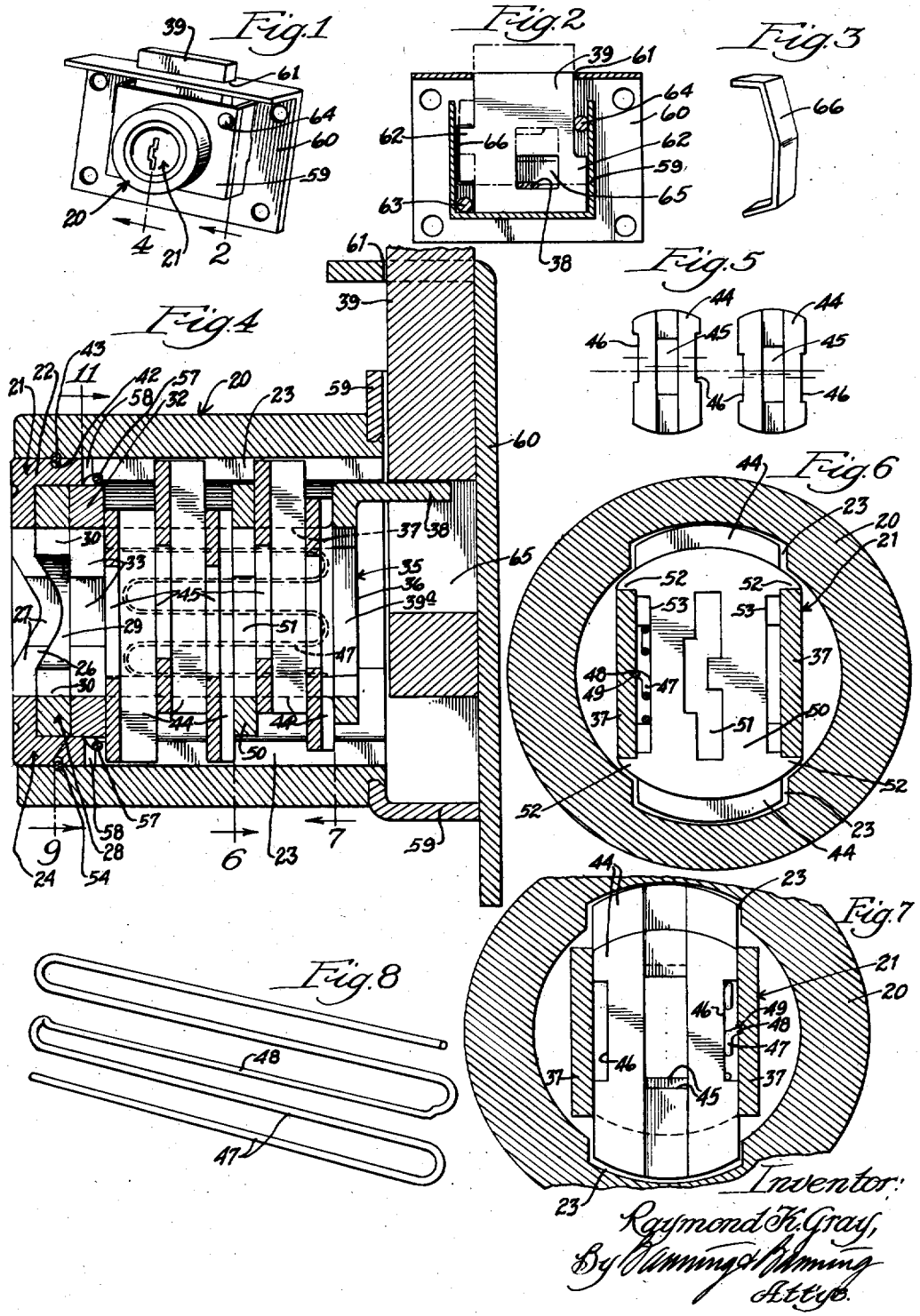
Inventor:
Raymond K. Gray,
By Cumming & Cumming
Atty's.

Oct. 27, 1936. R. K. GRAY Re. 20,143

LOCK

Original Filed Jan. 26, 1931 2 Sheets-Sheet 2

Inventor:
Raymond K. Gray,
By Fenning & Fenning
Attys.

Reissued Oct. 27, 1936

Re. 20,143

UNITED STATES PATENT OFFICE 20,143

LOCK

Raymond K. Gray, Chicago, Ill.

Original No. 1,937,224, dated November 28, 1933, Serial No. 511,335, January 26, 1931. Application for reissue November 15, 1935, Serial No. 50,045

19 Claims. (Cl. 70—46)

This invention relates to tumbler locks and keys therefor.

Among the objects of the invention are to provide a novel plug for carrying the tumblers, to provide novel means for securing the plug in its barrel, to provide snap means for resiliently holding the plug in its extreme positions, to provide novel key guides in the plug, to provide novel means to project the tumblers into locking position while retaining them in assembled relation, to provide an improved sliding bolt.

These and other objects will appear from the following description of a preferred embodiment taken in conjunction with the accompanying drawings, in which—

Figure 1 is a perspective view of a cabinet lock embodying the invention;

Fig. 2 is a sectional view thereof on the line 2 of Fig. 1;

Fig. 3 is a perspective view, on a larger scale, of the spring associated with the bolt;

Fig. 4 is a sectional view through the lock on the line 4 of Fig. 1;

Fig. 5 shows in elevation two typical tumblers used in the lock;

Fig. 6 is a section through the plug and barrel on the line 6 of Fig. 4;

Fig. 7 is a section through the plug and barrel on the line 7 of Fig. 4;

Fig. 8 is a perspective view of a spring for projecting tumblers from the plug into locking position;

Figure 9:
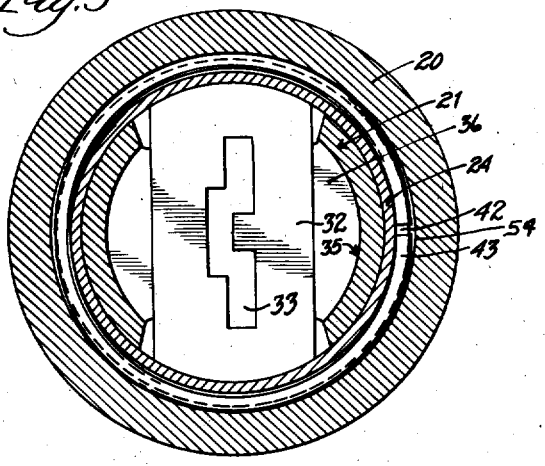
Fig. 9 is a section through the plug and barrel on the line 9 of Fig. 4.

Referring to the drawings, the numeral 20 designates a barrel which receives a plug designated generally by the numeral 21. The outer portion of the bore of the barrel is enlarged to accommodate the head 22 of the plug and provide an annular recess 58 behind same. The remainder of the bore is provided with diametrically opposite slots 23 which are adapted to receive the ends of the tumblers in locking position. The slots 23 open into the enlarged portion of the bore as shown in Fig. 4.

Figure 13:
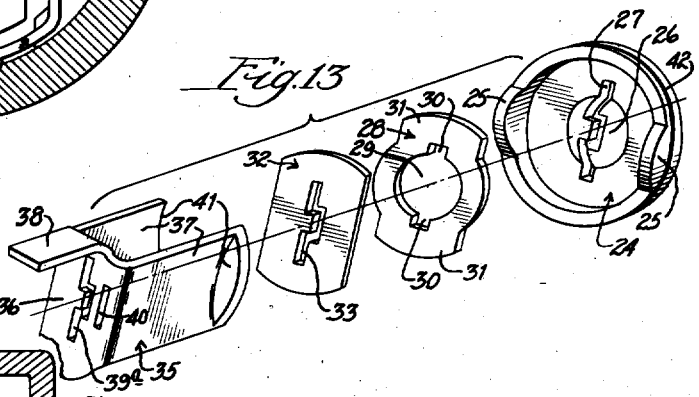
Fig. 13 is a perspective view showing the parts of the plug before assembly.
Figure 14:
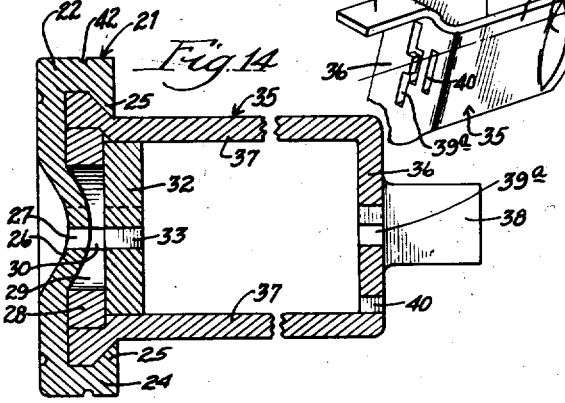
Fig. 14 is a sectional view through the assembled plug.

The parts from which the plug is assembled are shown in Fig. 13. They comprise a plug cap 24 which may suitably be formed from flat stock by suitable stamping operations. The cap is substantially cupped and is provided with ears 25 which project slightly above the cup edge. The center of the face of the cap is dished inwardly to provide a central boss 26, and is also provided with a suitable key-way 27 which is adapted to receive the desired configuration of key. The plug further comprises a frame spacer 28 which is provided with a central opening 29 which is adapted to receive the boss 26, as shown in Fig. 13. The opening 29 is enlarged by diametrically opposed slots 30 which overlie the outer ends of the key-way 27 to limit entry of the key therethrough into the plug.

The frame spacer 28 is provided with extensions 31 which have an exterior curvature approximately the same as the interior of the cap 24. Between the extensions 31 the frame spacer 28 is cut away to a smaller curvature for a purpose which will hereinafter appear. After the frame spacer 28 is placed within the cap 24 in proper relation to the key-way 27, the key-way frame spacer 32 is superimposed thereon so that its key-way 33 is in alignment with the key-way 27. The key-way frame spacer 32 is substantially oblong in configuration, but its outer ends are curved so that it may fit snugly within the cap 24. When assembled the key-way frame spacer covers the extensions of the frame spacer 28. The key-way frame spacer 32 is located partly within the cylindrical wall of the cap 24.

The plug frame is designated by the numeral 35. This frame may suitably be made from flat stock suitably bent to provide a back 36 and substantially parallel sides 37. A portion of the back is bent rearwardly to provide a projecting lug 38 which is adapted to engage a bolt 39 or other member which is intended to be operated by the lock. The back 36 is provided with a key-way 39ª which is brought into alignment with the key-ways 33 and 27 when the plug is assembled. On one side of the key-way 39ª the back 36 is provided with an opening 40, the purpose of which will hereinafter appear. The forward or free end of the sides 37 are crimped outwardly to arcuate formation, as shown at 41. The crimping is such that the outer surfaces of the crimps 41 are adapted to conform to the interior of the cap 24.

The plug frame 35 is brought into assembled relation with the remaining parts of the plug so that the crimps 41 surround the cut away portions between extensions 31 of the frame spacer 28. The adjacent portions of the sides 37 are thus arranged along the straight sides of the key-way frame spacer 32. During the assembly the various elements are assembled on a pilot to align the key-ways, and the ears 25 are swedged downwardly to effectively secure the parts of the plug together. The exterior cylindrical surface of the cap is provided with a groove 42 for receiving a plug retaining ring 43 which will hereinafter be further described. The face of the cap may be provided with a circular groove to improve its appearance.

The space enclosed by the plug frame 35 and the key-way frame spacer 32 is adapted to receive a series of tumblers 44 which are provided with openings 45 into which the key passes in order to withdraw the projecting ends of the tumblers out of the slots 23. As shown in Figs. 4, 5 and 7, it is preferred to slot one face of each tumbler 44 longitudinally and centrally, and to make the openings 45 through the web of metal at the bottom of such slots. Along one, or preferably both sides, as shown in Figs. 5 and 7, each tumbler is provided with a recess 46. By providing a recess in both sides I am able to direct each tumbler in either direction. The recesses 46 are differently located in certain of the series of tumblers so that they may be brought into alignment when the tumblers are unequally projected, which corresponds with the locking of the plug to the barrel 20. As will be readily seen in Fig. 5, the recess 46 is displaced with respect to the center of the tumbler and the key opening 45 is preferably also displaced in the same direction. This location of the key-way openings has the result that the key-way openings of the series of tumblers are in near registration with each other, as shown in Fig. 4 when the tumblers are in their locked position so that the key may readily be inserted therein. A further advantage is that the lock is harder to pick since the location of the key-way opening affords no clue as to the direction or extent of the projection of the tumbler. As shown in Fig. 5, it is preferred to displace the key-way opening from the center of the tumbler to a less extent than the displacement of the recess 46 in order to avoid excessive depth in the slots 23.

For the purpose of effecting the projection of the ends of the tumblers, I provide in the aligned recesses 46 on one side of the plug, or both sides, if desired, a spring 47. The spring 47 is suitably formed from a length of wire bent backwards and forwards, as shown in Fig. 8, so that the whole wire except the center length 48 lies in substantially one plane. The central length 48 of the spring 47 is bent outwardly from the plane of the rest of the spring. A groove 49 may be formed in the inner face of the adjacent plug frame side 37, into which the projecting length 48 moves when the tumblers are assembled. The spring may be slipped into position together with the tumblers, or it may be compressed and inserted through the opening 40 in the back 36 of the plug.

The opening 40 is relatively small so that the spring expands after moving therethrough and is unable to return into the opening 40. It will be readily understood that the spring 47 tends to bring the recesses 46 of the tumblers 44 into alignment. When the recesses are thus brought into alignment, certain of the tumblers project in opposite directions so as to permit locking of the plug to the barrel 20. It will readily be understood that when the projecting ends of the tumblers are withdrawn from the slots 23, which is done by the appropriate key, the recesses 46 will be staggered and the spring 47 will be compressed. The engagement between the projecting length 48 of the spring 47 with the groove 49 maintains the plug and tumblers assembly centered and capable of being handled as a unit without the tumblers falling out. I prefer to provide within the plug one or more key-way guides 50, one of which is shown in Fig. 6. As shown in Fig. 4, the guide 50 may suitably be located about one-half way between the head of the plug and its back. It will be understood, however, that one or more guides may be located at any desired point or points with relation to the tumblers. The guide 50 may suitably be in the form of a plate provided with a key-way 51, which plate may suitably be of the same configuration as the tumblers, with the exception that it is provided with ears 52 which extend over the edges of the plug sides 37.

The plate 50 is provided with lateral recesses 53, which are not smaller than the recesses 46 of the tumblers when the same are in locking position, so as not to impede the action of the spring. The guides 50 are inserted in the plug opening and are rotated so as to bring the ears 52 into the position shown in Fig. 5. The tumblers are then inserted, and finally the spring 47 is inserted through the opening 40. The guide 50 also serves as a tumbler spacer and may be associated with a thin tumbler, as shown in Fig. 4.

Figure 10:
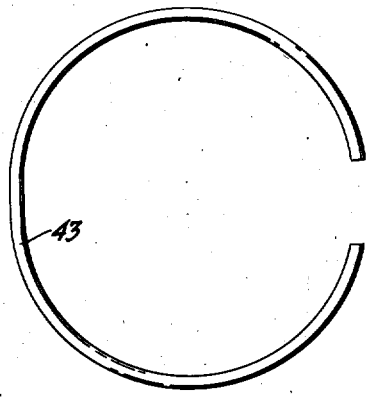
Fig. 10 is a view of the plug retaining ring.
Figure 11:
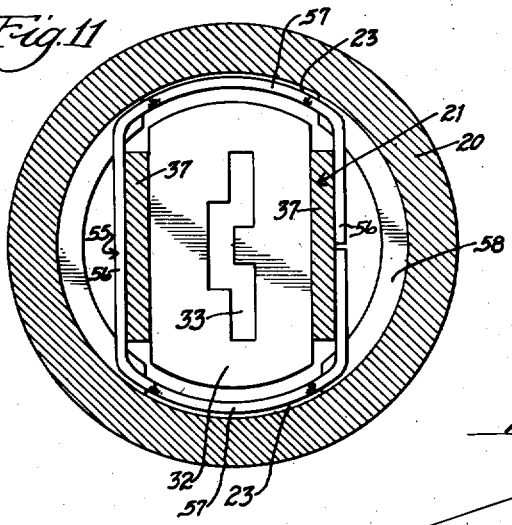
Fig. 11 is a section through the plug and barrel on the line 11 of Fig. 4.

The plug is retained in position in the barrel 20 by means of the split ring 43 which engages the groove 42 in the cap of the plug and a corresponding groove 54 in the interior of the barrel 20. As shown in Fig. 10, the ring 43 is formed substantially oval so that, when in assembled relation, the ring 43 resiliently bears against the bottom of the groove 54 and also the bottom of the groove 42, as shown in Fig. 9. This structure renders the rotation of the plug within the barrel uniform and pleasant to the touch. The frictional engagement of the spring 43 with both members offers a uniform resistance to the rotation of the plug. In addition to this function, the ring 43 acts in the usual manner to retain the plug and cylinder assembled.

Figure 12:
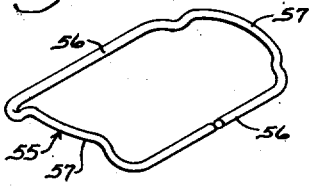
Fig. 12 is a perspective view of a ring which is adapted to resiliently hold the plug in its extreme positions.

It is preferred to provide means whereby the plug is resiliently held in either of its extreme positions, and which give a snap action when the plug is moved into such positions. For this purpose I arrange around the plug adjacent its head 22 a snap ring 55 which is shown in perspective in Fig. 12. This ring comprises straight sides 56 which engage the sides of the plug so as to be rotated therewith. The sides 56 are connected by ends 57 which are arcuate in plan and are displaced out of the plane of the sides 56 so that they may project into the slots 23 when presented thereto.

The annular recess 58 receives the ring 55, and is of such width that the ends 57 are deformed towards the plane of the sides 56 when the plug is in its intermediate positions. When the plug reaches an extreme position, the ends 57 are released and snap into the ends of the slots 23, giving the snap action above referred to. When the plug is moved out of its extreme position, the ends 57 have to be again pressed so that a certain force has to be overcome before the plug can be rotated, after the insertion of the key. This action is pleasing to the touch of the manipulator, and moreover, insures proper position of the plug with respect to the barrel for the attainment of smooth key movement.

It will be readily understood that the plug and barrel, above described, may be used in any desired situation. As shown in Figs. 1 to 4, they may be associated with a cabinet lock, the rear end of the barrel 20 being swedged or otherwise secured upon a bolt housing 59 which in turn is secured to an attachment plate 60 of conventional type. The bolt 39 is enclosed between the housing and attachment plate and projects through an opening 61 in the upper flange of the attachment plate. The bolt is provided inside the housing with projecting lugs 62, and the housing and attachment plate are secured together by rivets 63 and 64. The rivet 64 serves as a stop to prevent the withdrawal of the bolt beyond a certain amount. The bolt 39 is provided with an opening 65 into which the lug 38 projects. The opening 65 may be of substantial width in the direction of movement of the bolt in order to provide a certain amount of lost motion of the bolt with respect to the rotatable lug 38. The opening 65 is offset with respect to the plug 21 so that one of its vertical sides serves as a stop for the lug 38 in its extreme positions.

In order to render the movement of the bolt smooth, I prefer to apply to one of the lugs 62 a spring 66. The ends of the spring 66 are turned inwardly to engage the top and bottom of the lug. The intermediate portion of the spring 66, which is superimposed upon the face of the lug 62, is bowed outwardly somewhat so that it exerts a certain pressure upon the bolt and upon the adjacent wall of the bolt housing 59.

Although the invention has been described in connection with the details of specific embodiments thereof, it must be understood that such details are not intended to be limitative of the invention except insofar as set forth in the accompanying claims.

I claim:

1. A plug for tumbler locks, comprising a frame formed from flat stock and having a back and parallel sides, the ends of the sides being arcuate, a cap in which the arcuate ends are located, and a spacing element between the sides, the plug being maintained assembled by deformation of the cap.

2. A plug for tumbler locks, compising a frame formed from flat stock and having a back and parallel sides, the ends of the sides being crimped into arcuate form, a cap in which the arcuate ends are located, a spacing element within the cap between the crimped ends, a spacing element rearwardly thereof partly located within the cup, the plug being maintained assembled by deformation of the cap.

3. A plug for tumbler locks, comprising a frame formed from flat stock and having spaced parallel sides, a back, a bolt engaging lug integral with the back and sides and extending rearwardly therefrom, and a head to which the sides are secured.

4. In a tumbler lock, a plug defining a tumbler space, a series of tumblers therein, each of which is provided with lateral recesses defining, with an adjacent side of the plug, a space within the plug, and a spring within the space having a plurality of connected parallel lengths lying substantially in a plane except the central length which is displaced outwardly from said plane, the side of the frame being provided with a groove in which the displaced length resiliently enters.

5. In a tumbler lock, a plug defining a tumbler space, a key-way guide freely inserted in the tumbler space and provided with ears which overhang the sides of the plug, and a series of tumblers in the tumbler space lying on both sides of the guide so as to prevent rotation of the key-way guide.

6. In a tumbler lock, a stationary barrel provided with a tumbler slot, a plug rotatable therein and carrying tumblers adapted to enter the slot, and a snap ring rotatable with the plug and having a resilient laterally projecting portion adapted to enter the end of the slot.

7. In a tumbler lock, a stationary barrel having an enlarged bore at the front end, the smaller portion of the bore being provided with a longitudinal slot, a plug having a head rotatably mounted within the barrel, means for retaining the plug in the barrel so that the head occupies the front portion of the enlarged bore leaving an annular space between the head and the portion of smaller bore, a ring adapted to project into the annular space, the ring being rotatable with the plug and having a resilient portion adapted to enter the slot when the tumblers are brought into registry therewith.

8. In a tumbler lock, in combination, a barrel having an enlarged forward bore and a smaller rear bore, the portion of smaller bore being provided with opposite slots, a plug rotatably mounted in the barrel and comprising a head and a tumbler frame having flat sides, means for retaining the plug in the barrel so that an annular space is left between the head and portion of smaller bore, a resilient ring having straight sides engaging the sides of the plug, and connecting arcuate lengths adapted to enter and move through the annular space, the arcuate lengths being deformed so that parts thereof enter the ends of the slots when the tumblers are brought into registry therewith.

9. In a lock, a bolt housing, a bolt slidable therein and provided with a projecting lug, a flat spring with inturned ends engaging the top and bottom of the lug and having its intermediate portion bowed outwardly to resiliently engage the housing wall.

10. In a lock, a bolt housing, a bolt slidable therein and provided with a projecting lug on each side, a flat spring secured upon one lug and resiliently bearing upon the adjacent housing wall so as to press the other lug against the opposite wall.

11. In a tumbler lock, a plug, a plurality of tumblers slidably mounted therein, each tumbler being provided with a lateral recess and a key opening, and resilient means in the recesses tending to align same, the recess and key opening of each tumbler being displaced from the center of the tumbler in the same direction, the key openings being in substantial alignment when in the locking positions.

12. In a tumbler lock, a plug, a plurality of tumblers slidably mounted therein, each tumbler being provided with a lateral recess and a key opening, and resilient means in the recesses tending to align same, the recess and key opening of each tumbler being displaced from the center of the tumbler in the same direction and the displacement of the key opening being less than that of the recess, the key openings being in substantial alignment when in the locking positions.

13. A tumbler provided with a lateral recess and a key opening, the recess and key opening being displaced from the center of the tumbler in the same direction, the key openings being in substantial alignment when in the locking positions.

14. A tumbler provided with a lateral recess and a key opening, the recess and key opening being displaced from the center of the tumbler in the same direction and the displacement of the key opening being less than that of the recess, the key openings being in substantial alignment when in the locking positions.

15. A plug for tumbler locks comprising a frame having a back with sides extended therefrom in parallel relation, a cap joined to the free ends of the two sides, there being a protrusion centrally of the cap, a first spacer adjacent the cap recessed centrally to accommodate the cap protrusion, and a second spacer arranged adjacent the first.

16. A plug for tumbler locks comprising a frame formed from flat stock and having a back and parallel sides extending therefrom, a flanged cap joined to the free ends of the two sides, there being a protrusion centrally of the cap, a first spacer adjacent the cap recessed centrally to accommodate its protrusion, and a second spacer adjacent the first and lapped by the flanges of the cap.

17. A plug for tumbler locks comprising a frame formed from flat stock and having a back and parallel sides extending therefrom, a flanged cap joined to the free ends of the two sides, there being a protusion centrally of the cap, a first spacer adjacent the cap recessed centrally to accommodate its protrusion, and a second spacer adjacent the first and lapped by the flanges of the cap, there being formed in the cap and spacers key hole slots one of which extends beyond another.

18. In a lock, the combination of a casing having a bore therethrough and a groove at one side, and longitudinal of said bore, a plug mounted rotatably in the bore and provided with a longitudinal slot for the key for the lock and a transversely extending pocket intersecting said key slot, key-operable plate tumblers mounted in the pocket so that they are free to slide transversely of the plug into and out of interlocking relation with the groove in the casing, and a separately formed guide plate for the key extending transversely across the central portion of the pocket and serving to separate the tumblers into groups, said plate being provided at the ends thereof with laterally projecting lugs whereby it is locked against transverse movement relatively to the plug when the latter is mounted in place in the bore of the casing.

19. In a lock, the combination of a casing having a bore therethrough and a groove at one side, and longitudinal of said bore, a plug adapted for rotative mounting in the bore and provided with a longitudinal slot for the key for the lock and a transversely extending pocket intersecting said key slot, key-operable plate tumblers mounted in the pocket so that they are free to slide transversely of the plug into and out of interlocking relation with the groove in the casing, and a separately formed guide plate for the key mounted between certain of the tumblers, conterminous with opposite ends thereof and slotted internally in conformity with the cross sectional contour of the key to be admitted therethrough, the guide plate extending transversely across the central portion of the pocket and serving to separate the tumblers into groups, said plate being provided with means co-acting with the plug whereby it is locked against transverse movement relative to the plug when the latter is mounted in place in the bore of the casing.

RAYMOND K. GRAY.